(12) United States Patent
Coppinger et al.

(10) Patent No.: US 7,102,493 B1
(45) Date of Patent: Sep. 5, 2006

(54) ASSET MONITORING AND TRACKING SYSTEM

(75) Inventors: James B. Coppinger, Chattanooga, TN (US); Kevin R. DeBinder, Caryville, TN (US); Norman A. Thomas, Trenton, GA (US)

(73) Assignee: Innovative Processing Solutions, LLC, Knoxville, TN (US)

( * ) Notice: Subject to any disclaimer, the term of this patent is extended or adjusted under 35 U.S.C. 154(b) by 0 days.

(21) Appl. No.: 11/208,874

(22) Filed: Aug. 22, 2005

Related U.S. Application Data

(62) Division of application No. 10/324,947, filed on Dec. 20, 2002, now Pat. No. 6,982,656.

(51) Int. Cl.
   *B60R 25/10* (2006.01)

(52) U.S. Cl. ............ 340/426.19; 340/988; 340/989; 340/426.18; 342/457; 701/213

(58) Field of Classification Search ......... 340/988, 340/989, 990, 992, 994, 426.1, 995.12, 995.23, 340/426.12, 426.17, 426.16, 426.18, 426.19, 340/426.2, 426.21, 426.25, 426.24, 426.28, 340/431, 825.36; 235/382; 701/207, 213; 342/457
See application file for complete search history.

(56) References Cited

U.S. PATENT DOCUMENTS

| | | | |
|---|---|---|---|
| 4,651,157 A * | 3/1987 | Gray et al. ............ | 342/457 |
| 4,897,642 A | 1/1990 | DiLullo et al. ......... | 340/991 |
| 5,025,253 A | 6/1991 | DiLullo et al. ......... | 340/991 |
| 5,068,656 A | 11/1991 | Sutherland ............ | 340/989 |
| 5,497,149 A | 3/1996 | Fast .................... | 340/988 |
| 5,532,690 A * | 7/1996 | Hertel ................. | 340/989 |
| 5,541,845 A | 7/1996 | Klein .................. | 340/990 |

(Continued)

Primary Examiner—Brent A. Swarthout
(74) Attorney, Agent, or Firm—Luedeka, Neely & Graham

(57) ABSTRACT

An apparatus and method for monitoring and reporting the status of a mobile asset are described, where the mobile asset may be moved by a transport vehicle from a starting location to a destination location. The method includes providing destination information to a tracking device on the mobile asset, and setting a boundary about the destination location which is also referred to herein as a geoboundary. As the mobile asset moves from the starting location to the destination location, the current location of the mobile asset is determined, and a determination is made whether the current location is within the geoboundary. If the current location of the mobile asset is within the geoboundary, an arrival message is transmitted from the tracking device. Preferred embodiments of the invention include the step of transmitting a departure message from the tracking device if the current location of the mobile asset moves from within the geoboundary to outside the geoboundary. The tracking device apparatus preferably includes a tether sensor and one or more door sensors. The tether sensor senses whether the mobile asset is electrically connected to or disconnected from the transport vehicle, and the one or more door sensors sense whether one or more doors on the mobile asset are open or closed. The apparatus includes a processor, a location determining device for determining the geographic location of the mobile asset, and a transceiver for transmitting and receiving status messages related to the status of the mobile asset.

15 Claims, 5 Drawing Sheets

U.S. PATENT DOCUMENTS

| | | |
|---|---|---|
| 5,751,245 A | 5/1998 | Janky et al. ................ 340/993 |
| 5,808,565 A | 9/1998 | Matta et al. ................ 340/994 |
| 5,825,283 A | 10/1998 | Camhi ....................... 340/438 |
| 5,870,029 A | 2/1999 | Otto et al. ............. 340/825.36 |
| 5,917,433 A | 6/1999 | Keillor et al. .............. 340/989 |
| 5,969,595 A | 10/1999 | Schipper et al. ........... 340/426 |
| 5,999,091 A * | 12/1999 | Wortham .................... 340/431 |
| 6,142,372 A | 11/2000 | Wright ....................... 235/382 |
| 6,184,801 B1 * | 2/2001 | Janky ........................ 340/988 |
| 6,675,006 B1 * | 1/2004 | Diaz et al. ................ 455/404.1 |
| 6,696,938 B1 * | 2/2004 | Flick ......................... 340/468 |

\* cited by examiner

ASSET MONITORING AND TRACKING SYSTEM

This application is a divisional of application Ser. No. 10/324,947 filed Dec. 20, 2002 now U.S. Pat. No. 6,982,656.

TECHNICAL FIELD

The present invention is generally directed to monitoring the status of an asset, such as a trailer portion of a tractor-trailer vehicle. More particularly, the invention is directed to monitoring whether the asset crosses a predetermined boundary, and tracking the asset after it has crossed the boundary.

BACKGROUND OF THE INVENTION

Each day, thousands of tractor-trailer trucks travel our nation's highways transporting cargo from one location to another. Trucking companies, who are responsible for making sure the cargo reaches its intended destination on time, need the ability to track the status of the cargo throughout its journey. The trucking companies need to be able to monitor the status of a trailer from the time it is loaded with cargo, as it travels to its destination, after it reaches its destination, and after its cargo is unloaded. As the trucking companies add more and more trailers to their fleets, it is becoming more difficult to monitor the status of each trailer.

Prior asset tracking systems, which have depended primarily on the actions of drivers and dispatchers to report and track the status of the cargo and trailer, have been lacking in their effectiveness. Even prior automated tracking systems have not adequately monitored the status of trailers once the trailers have been dropped off at a destination.

What is needed, therefore, is a new and innovative approach to monitoring and reporting the status of mobile assets, such as trailers and their valuable cargo.

SUMMARY OF THE INVENTION

The foregoing and other needs are met by a method for monitoring and reporting the status of a mobile asset, where the mobile asset may be moved by a transport vehicle from a starting location to a destination location. The method includes providing destination information to a tracking device on the mobile asset, and setting a boundary about the destination location which is also referred to herein as a geoboundary. As the mobile asset moves from the starting location to the destination location, the current location of the mobile asset is determined, and a determination is made whether the current location is within the geoboundary. If the current location of the mobile asset is within the geoboundary, an arrival message is transmitted from the tracking device.

Preferred embodiments of the invention include the step of transmitting a departure message from the tracking device if the current location of the mobile asset moves from within the geoboundary to outside the geoboundary.

In another aspect, the invention provides an apparatus for monitoring and reporting the status of a mobile asset, where the mobile asset may be moved by a transport vehicle from one location to another location. The apparatus includes a tether sensor and one or more door sensors. The tether sensor is for sensing whether the mobile asset is electrically connected to or disconnected from the transport vehicle, and for providing a tether sensor signal indicative of whether the mobile asset is electrically connected to or disconnected from the transport vehicle. The one or more door sensors are for sensing whether one or more doors on the mobile asset are open or closed, and for providing one or more door sensor signals indicative of whether one or more doors on the mobile asset are open or closed. The apparatus includes a location determining device for determining a geographic location of the mobile asset, and for providing a location signal indicative of the geographic location of the mobile asset. The apparatus also includes a transceiver for transmitting and receiving status messages to and from a central monitoring station, where the status messages are related to the status of the mobile asset. A processor in the apparatus receives the tether sensor signal, the one or more door sensor signals, the location signal and any status messages sent by the central monitoring station.

Under normal operation, the central monitoring station preferably sends a message to the transceiver on the mobile asset for the purpose of programming the processor with the location (such as latitude/longitude) of the destination of the mobile asset, the dimensions (such as a radius) of a geoboundary associated with the destination, the frequency at which the mobile asset should transmit location and sensor status updates while travelling to the destination, and instructions to program the processor to communicate or ignore changes of each sensor's status while inside the geoboundary. Upon receiving this message, the processor preferably saves the mobile asset's current location (such as latitude/longitude) as the origin and the current date and time as a timestamp. The frequency of location/status updates is communicated to the processor as distance and time intervals.

The processor preferably sends a location/status update whenever the mobile asset's current location differs from the origin by the specified distance interval, or the current date/time differs from the timestamp by the specified time interval. Each time, and for whatever reason, the location/status update is sent, the origin and timestamp are preferably reset to the current location and date/time.

Upon traveling inside the geoboundary of the specified destination, the processor preferably transmits an 'Arrival' message. While inside the geoboundary, an event, such as any change in the status of each sensor, is preferably communicated or ignored based on the instructions previously received, and the frequency at which the processor sends location/status updates is controlled by the specified time interval. In preferred embodiments, the location signal is constantly monitored while inside the geoboundary When the location signal indicates that the mobile asset has traveled outside the geoboundary, a 'Departure' message is sent by the processor. As a result of the departure from the geoboundary, the destination location is preferably cleared. While outside the geoboundary, if the tether sensor signal indicates that the mobile asset is electrically disconnected from the transport vehicle, or one or more of the door sensor signals indicate that one or more of the doors on the mobile asset are opened, the processor immediately sends a message indicating the sensor change and the current location.

Preferred embodiments of the apparatus include a power sensor for sensing whether external power is applied to or removed from the apparatus, and a load sensor for sensing whether the mobile asset is loaded or unloaded. When the load sensor indicates that the mobile asset is unloaded, or when the power sensor indicates that external power is removed and the tether sensor indicates that the mobile asset is electrically disconnected from the transport vehicle, the processor determines the origin of the mobile asset and sets the geoboundary about the first location.

In another aspect, the invention provides a method for monitoring and reporting the status of a mobile asset, where the mobile asset may be moved by a transport vehicle from one location to another location. The method includes the steps of sensing whether the mobile asset is electrically connected to or disconnected from the transport vehicle, and sensing whether one or more doors on the mobile asset are open or closed. When the mobile asset is electrically disconnected from the transport vehicle, or one or more of the doors on the mobile asset are opened, a first location of the mobile asset and a geoboundary about the first location are determined. The method further includes the steps of determining whether the mobile asset moves beyond the geoboundary, and transmitting a status message to a central monitoring station when the mobile asset has moved beyond the geoboundary.

In yet another aspect, the invention provides a method for monitoring and reporting the status of a mobile asset, where the mobile asset may be moved from one location to another location by a transport vehicle which is operated by a driver. The method includes receiving a driver exit message indicating that the driver is exiting the transport vehicle, and determining a first location of the mobile asset and a geoboundary about the first location based on receipt of the driver exit message. The method also includes determining whether the mobile asset moves beyond the geoboundary before a driver reentry message is received. If the mobile asset does move beyond the geoboundary before the driver reentry message is received, a status message is transmitted to a central monitoring station indicating an unauthorized departure of the mobile asset.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows.

DETAILED DESCRIPTION OF THE PREFERRED EMBODIMENT

Figure 1:
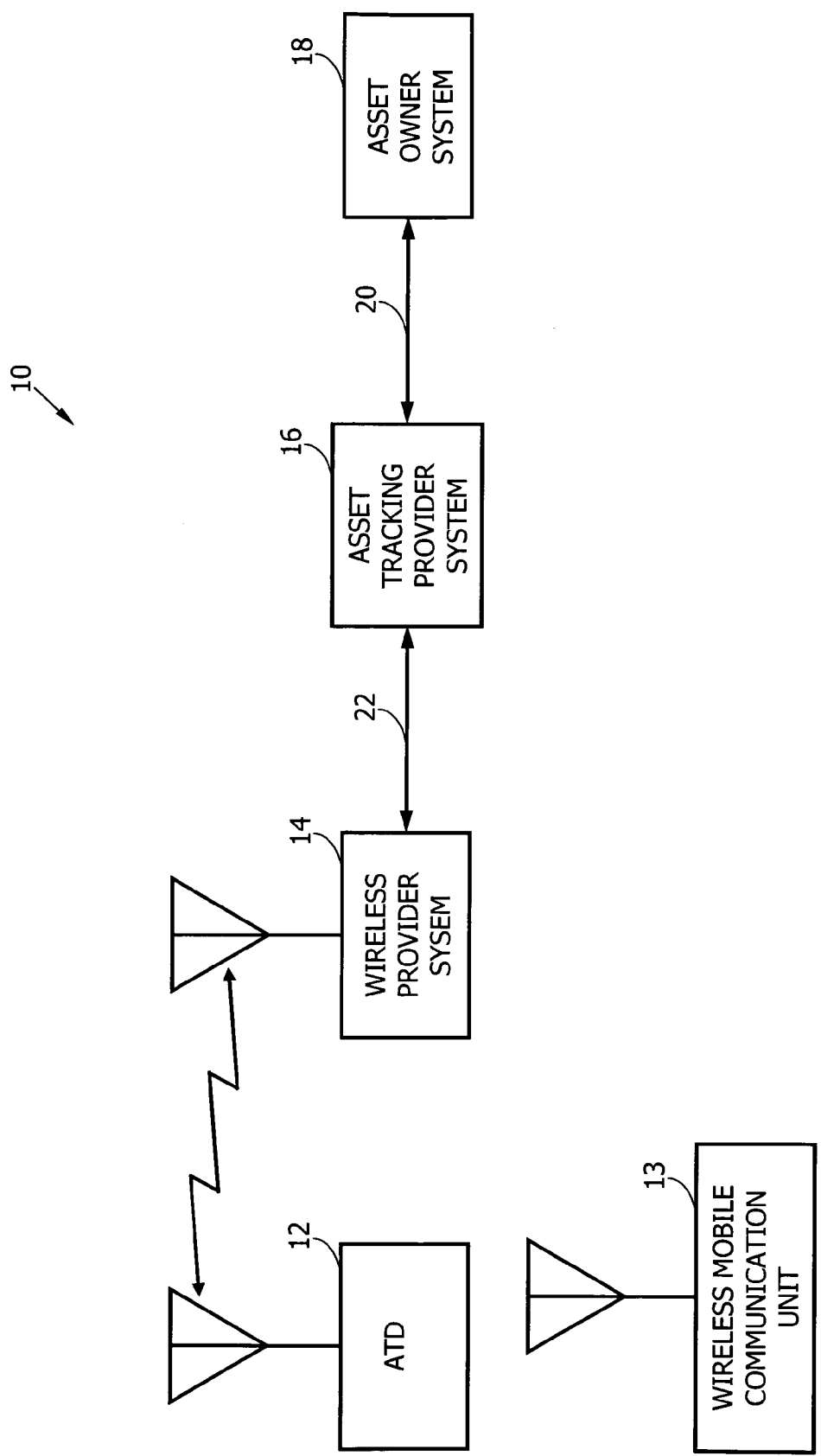
FIG. 1 is a functional block diagram of a system for monitoring and reporting the status of a mobile asset according to a preferred embodiment of the invention.

Depicted in FIG. 1 is a system 10 for monitoring and reporting the status of a mobile asset, such as a trailer or other cargo container. In the preferred embodiment of the invention, the system 10 consists of four major components in a chain of communication: an asset tracking device (ATD) 12 which is mounted on or in the asset, a wireless communication provider system 14 for transmitting messages to and receiving messages from the ATD 12, an asset owner system 18, and an asset tracking provider system 16 for transferring messages between the wireless communication provider system 14 and the asset owner system 18.

The asset owner system 18, also referred to herein as a customer legacy system, represents a computer, or network of computers, associated with the owner of the asset being monitored. For example, the asset owner may be a trucking company which controls a fleet of tractor-trailer trucks, and the asset owner system may be the trucking company's freight management system. The asset owner system 18 preferably includes a database of information related to the status, location, and destination of each of the assets, such as the trailers, controlled by the asset owner.

The asset tracking provider system 16, also referred to herein as an asset management system, represents a computer, or network of computers, associated with an asset tracking service provider. Generally, the asset tracking provider system 16 is a communication interface between the asset owner system 18 and the ATD 12. Among other things, the asset tracking provider system 16 translates messages from one communication protocol, such as may be used for communications between the ATD 12 and the wireless communication provider system 14, to another communication protocol, such as may be used for communicating with the asset owner system 18. Although only one asset owner system 18 is depicted in FIG. 1, the asset tracking provider system 16 preferably serves many such asset owner systems 18 associated with many asset owners. In a preferred embodiment, the system 10 includes asset management system client software running on the asset owner system 18 which provides for communication between the asset owner system 18 and the asset tracking provider system 16.

In the preferred embodiment, communication between the asset tracking provider system 16 and the asset owner system 18 is via a dedicated computer network link 20, using a dedicated communication line. Alternatively, the network link 20 may be accomplished through a global public computer network, such as the Internet.

The wireless communication provider system 14 represents a network of wireless communication terminals, including antennas, transmission/reception hardware, and switching/networking hardware and software, such as is typically associated with a wireless communication service provider. In one embodiment of the invention, the wireless communication provider system 14 is a wireless telephone system, such as a cellular system. In an alternative embodiment, the wireless communication provider system 14 is a satellite communication system. In yet another embodiment, the wireless communication provider system 14 is a combination of cellular telephone and satellite communication systems. Although only one wireless communication provider system 14 is depicted in FIG. 1, it should be appreciated that there may be many such systems 14 to provide wireless communication with the ATD 12 as it moves across the country, and the systems 14 may be owned by several different wireless communication provider entities.

In the preferred embodiment, communication between the wireless communication provider system 14 and the asset tracking provider system 16 is via a dedicated, redundant computer network link 22, such as may be accomplished through a global public computer network, such as the Internet. Although, the links 20 and 22 are preferably provided via dedicated land lines, one skilled in the art will appreciate that the links 20 and 22 may be satellite links or other forms of wireless communication. In a preferred embodiment, the system 10 includes asset management system server software running on the asset tracking provider system 16 for controlling communication between the wireless communication provider system 14 and the asset management system client software running on the asset owner system 18.

Figure 2:
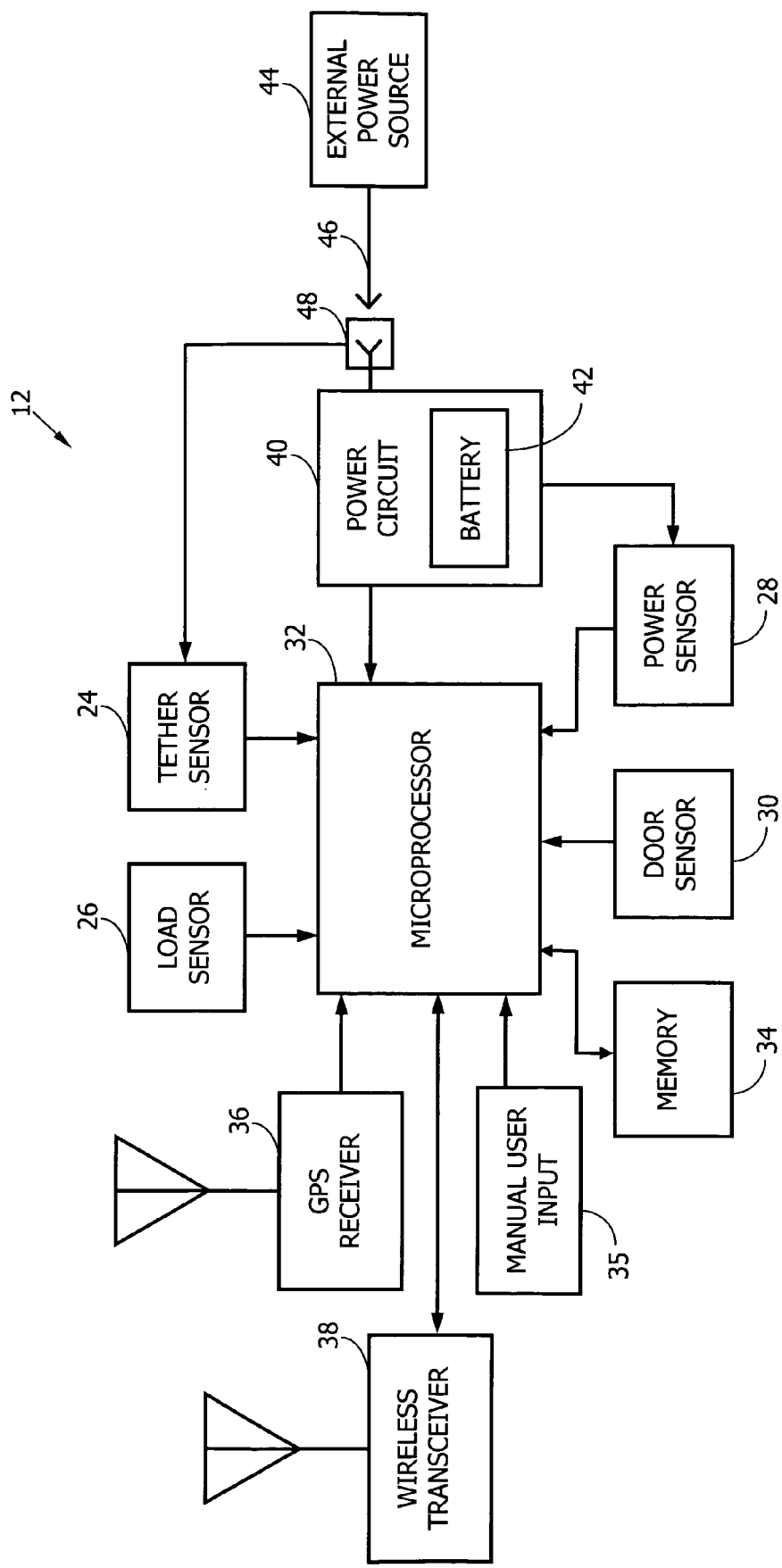
FIG. 2 is a functional block diagram of an asset tracking device according to a preferred embodiment of the invention.

A more detailed depiction of the components of the ATD 12 is provided in FIG. 2. As depicted in FIG. 2, the ATD 12 includes various sensors for monitoring the status of the asset with which the ATD 12 is associated. These sensors preferably include a tether sensor 24, a load sensor 26, a power sensor 28, and one or more door sensors 30. The function of each of these sensors is described in greater detail hereinafter. Output from the sensors is provided either directly or through a sensor interface to a microprocessor 32. The ATD 12 preferably includes at least four megabytes of flash memory 34 for storing several parameters which are described in more detail in the following discussion. The preferred embodiment of the ATD 12 includes a Global Positioning System (GPS) receiver 36, such as a receiver manufactured by Axiom Navigation, Inc., and a wireless transceiver 38, such as the model number CMM8600 Microburst transceiver manufactured by Standard Communications.

Electrical power for the ATD 12 is provided by a power supply circuit 40, which preferably includes a battery 42, such as a 12-volt gel-cell battery. When the associated asset is a trailer connected to a tractor, the trailer's electrical appliances, such as brake lights and turn indicator lights, are powered by an external power source 44 located on the tractor. The external power source 44 preferably connects to the power supply circuit 40 of the ATD 12 through an umbilical cable or tether 46 connected to a connector 48 on the trailer or on the housing of the ATD 12.

The tether sensor 24 is an electrical circuit for monitoring whether or not the tether 46 is connected to the connector 48. A preferred embodiment of the tether sensor 24 is described in U.S. Pat. No. 6,466,028. The tether sensor 24 provides a tether sensor signal to the microprocessor 32 indicative of the connection status of the tether 46.

The power sensor 28 is preferably used in conjunction with the tether sensor 24 to indicate whether or not the trailer is tethered to a tractor. The power sensor 28 provides a power sensor signal to the microprocessor 32 indicating whether or not electrical power is being provided by the external power source 44 via the tether 46.

The load sensor 26, such as a Minicube model load sensor manufactured by RandTec, senses the relative weight of the trailer to provide an indication of whether or not the trailer is loaded with cargo. The load sensor 26 provides a load sensor signal to the microprocessor 32 indicative of whether the trailer is loaded or unloaded.

The one or more door sensors 30 monitor whether one or more doors on the trailer are opened or closed. In the preferred embodiment, the door sensors 30 are magnetic switches coupled to ground. The door sensors 30 provide door sensor signals to the microprocessor 32 indicating whether the trailer doors are opened or closed.

The operation of the ATD 12 is preferably controlled by an event-driven firmware program running on the processor 32. This program uses events such as incoming messages, changes in geographic location, and changes in the status of the various sensors to monitor and report the status of the trailer. The program also generates outgoing messages to report any events associated with relevant changes in that status to the asset tracking provider system 16. The operation of the program according to the preferred embodiment of the invention is depicted in the flow charts of FIGS. 3–5.

In preferred embodiments of the invention, event communication control is the process of programming the ATD 12 to communicate one or more events. The events include, but are not limited to, entry or exit from the current geoboundary, the doors on a transportation trailer asset being opened or closed, a transportation trailer asset being tethered or untethered from a tractor, the external power to the ATD 12 being turned on or off, or a load sensor installed on a transportation trailer changing from loaded to unloaded or unloaded to loaded with the doors closed.

With respect to event communication, there are preferably two environments in which the ATD 12 operates, inside the geoboundary and outside the geoboundary. The communication of each event is preferably programmed separately in these two environments with the exception of the entry into or exit from the geoboundary. A list of events to be reported, both inside and outside the geoboundary, is referred to as the event communication profile.

Preferably, a command to change the event communication profile for the ATD 12 may be generated in one of two ways. It may be sent manually from the asset owner system 18 using the asset management system client software. This manual process may be used to change the event communication profile for a single device or a group of devices. Alternatively, the event communication profile can be defined in the asset management system client software and attached to various parameters, which can be extracted from the asset owner system 18 by the asset management system client software. Upon determining that one of these parameters in the asset owner system 18 has changed and there exists a new event communication profile linked to the parameter, the command is automatically sent (e.g. if an event communication profile is attached to the Shipping Order Type and the asset on which the ATD 12 is installed is dispatched on that order, the command is automatically sent).

One of the operational modes of the ATD 12 is referred to herein as the Tracking Mode. As discussed in more detail below, the Tracking Mode reports the current location and status of the ATD 12 at regular mileage or time intervals while the trailer is mobile, such as after every five miles traveled or every one hour elapsed since departure, until either the doors are opened, the trailer is untethered and external power is removed, or the Tracking Mode is turned off. As described below, the Tracking Mode may also be used to monitor a stationary trailer and report when the trailer has been moved outside a predetermined perimeter. Preferably, the Tracking Mode is activated and deactivated by begin-tracking and end-tracking messages sent to the ATD 12 from the asset owner system 18.

Preferably, Tracking Mode begins with the asset management system client software retrieving the address of the next destination of an asset from the asset owner system 18. This address is then programatically associated with a particular latitude/longitude by the asset management system server software. The address, latitude/longitude, and the default geoboundary value are then saved for future use. The geoboundary value may be maintained by the asset owner system 18 to reflect locations with larger or smaller physical areas. Programming the ATD 12 consists of sending a command including the latitude/longitude and geoboundary value associated with the destination.

Preferably, the command is triggered in one of two ways. First, the command may be manually sent from the asset owner system 18. Second, the asset management system client software may receive notification from the ATD 12 that it has departed its current location. The asset management system client software then, through integration with the asset owner system 18, determines the location of the next stop that the asset is scheduled to make. Once the location is determined, the asset management system client software determines the latitude/longitude and geoboundary value of the destination according to parameters in asset owner system 18, and sends the command automatically.

Figure 3:
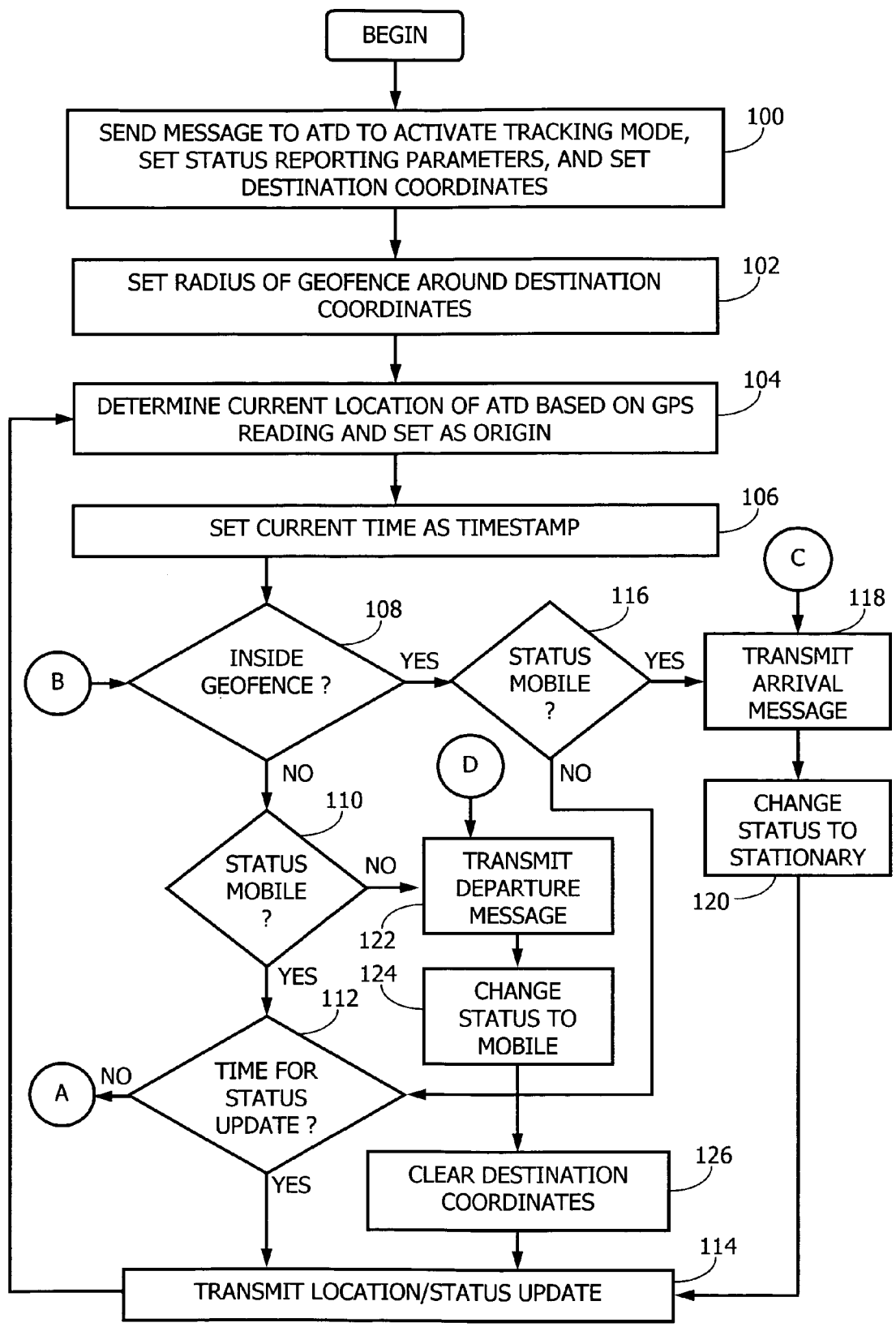
FIGS. 3, 4, and 5 depict methods for monitoring and reporting the status of a mobile asset according to preferred embodiments of the invention.

For example, as depicted in FIG. 3, the Tracking Mode may be activated by a begin-tracking message sent from the asset owner system 18 to the ATD 12 via the asset tracking provider system 16 and the wireless communication provider system 14 (step 100). The Tracking Mode may be activated when the trailer is stationary or mobile. Preferably, the stationary/mobile status of the trailer is indicated by a trailer status bit stored in a memory register.

Preferably, the begin-tracking message provides other information to the ATD 12, including the coordinates of the next destination and status reporting parameters. The status reporting parameters preferably include information related to the time and distance intervals at which sensor status updates are to be transmitted while the mobile asset is in route to the destination. The status reporting parameters also preferably specify which sensor values are to be reported as part of a sensor status message when the mobile asset is stationary.

As discussed above, the begin-tracking message also preferably provides the geoboundary value, which is a radius defining an imaginary circular boundary around the destination (step 102). Preferably, the size of the radius of the geoboundary depends on whether the trailer is moving or stationary. For example, if the trailer is stationary, such as while parked at a depot for loading or unloading, the radius may be set to a quarter mile or less. If the trailer is mobile, the radius may be set to five miles.

Upon activation of the Tracking Mode, the microprocessor 32 receives a location update reading from the GPS receiver 36, preferably in the form of longitude and latitude coordinates (step 104). These location coordinates are stored, preferably in the memory 34 or other memory register, as the 'origin'. The current time and date are stored as the timestamp (step 106).

When the Tracking Mode is active, the microprocessor 32 periodically receives a location update reading from the GPS receiver 36, and determines whether the current location is within the geoboundary (step 108). If the current location is not yet within the geoboundary, i.e., the mobile asset has not yet arrived at the destination, the microprocessor 32 accesses the trailer status word to determine whether the trailer is mobile or stationary (step 110). If the trailer status is mobile at step 110, the microprocessor 32 determines at step 112 whether it is time to transmit a wireless tracking update message to the asset tracking provider system 16 via the wireless communication provider system 14 indicating the location of the trailer (step 114). This determination is made based on whether the update time interval has expired, or whether the mobile asset has traveled the update distance interval since the last update message was transmitted. Preferably, based on the wireless tracking update message, the asset tracking provider system 16 sends a corresponding tracking update message to the asset owner system 18. The microprocessor 32 then stores the latest location update reading from the GPS receiver 36 in the memory 34 as the new origin (loop back to step 104).

Figure 4:
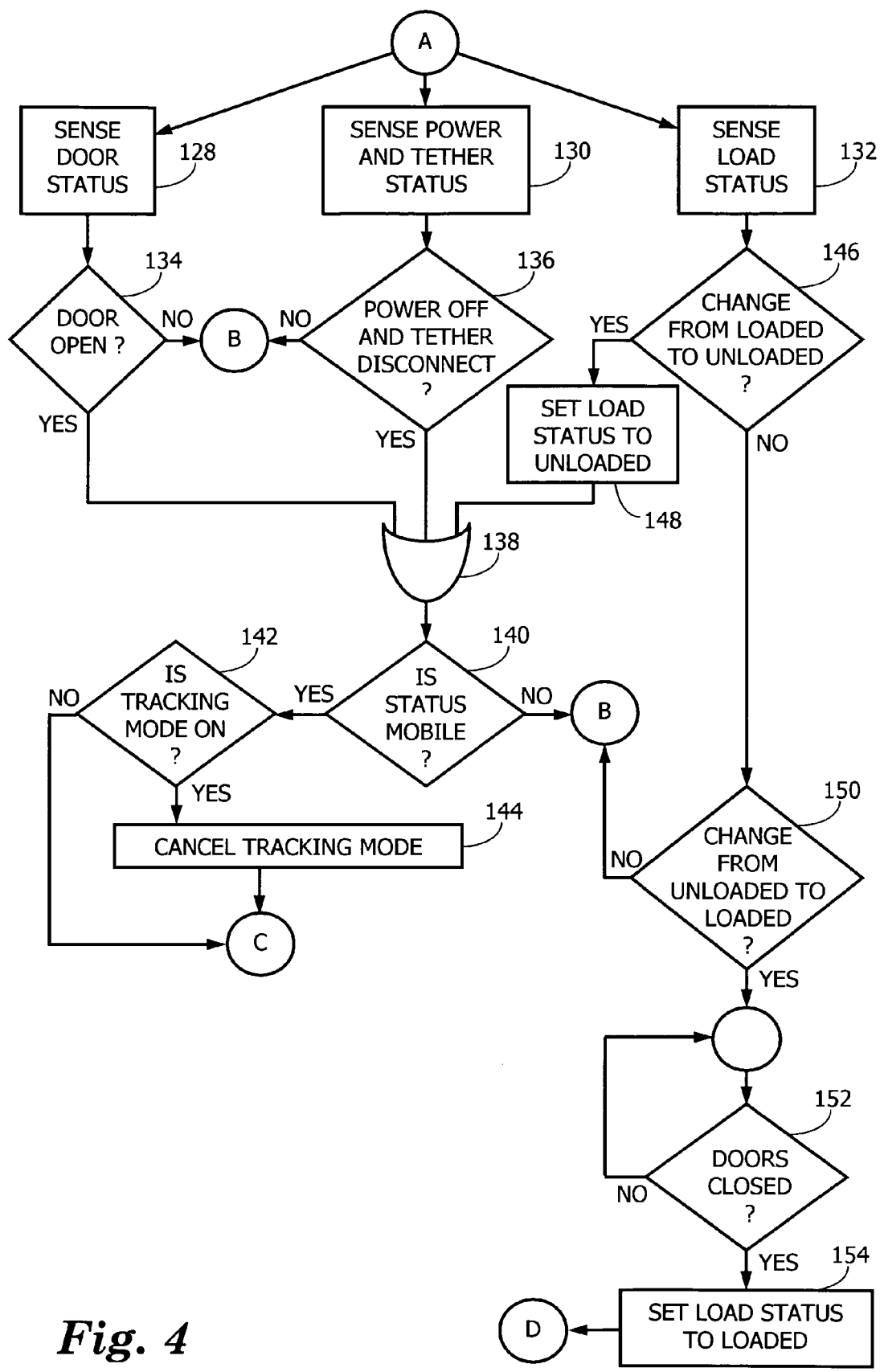

As depicted in FIG. 4, the microprocessor 32 periodically receives status updates from the door sensors 30 (step 128), the power and tether sensors 24 and 28 (step 130), and the load sensor 26 (step 132). Based on the program flow depicted in FIGS. 3 and 4, these sensor updates are preferably received after step 112. However, one skilled in the art will appreciate that these updates may occur additionally or alternatively at other times during the processing. Thus, the timing of the sensor updates depicted in FIGS. 3 and 4 are exemplary only, and the invention is not limited to any particular sensor update timing.

With reference to FIG. 4, if the door sensor signal indicates that no door on the trailer is open (step 128), and if the tether and power sensor signals indicate that the tether 46 is connected and/or power is being provided by the external power source 44 (step 130), processing continues at step 108. If the door sensor signal indicates that an event has occurred, such as a door on the trailer having been opened (step 128), or if the tether and power sensor signals indicate that an event has occurred, such as the tether 46 having been disconnected such that power is no longer being provided by the external power source 44 (step 130), the microprocessor 32 checks the trailer status bit to determine whether the trailer status is mobile or stationary (step 140).

As shown in FIG. 4, a change in the trailer load status from loaded to unloaded is another event indicating that a trailer has arrived at its destination. The load status change, which is discussed in more detail below, is preferably provided to an OR logic function (step 138) along with the door-open signal and the power-off/untether signals to indicate a trailer 'arrival'.

As indicated at step 130, the firmware of the preferred embodiment considers both the tether sensor signal and the power sensor signal to determine the tether status. If these sensor signals indicate either the presence of external power or that the tether 46 is connected, the trailer is considered to be 'tethered' to the tractor. Preferably, only when the opposite of both of these conditions exists (no external power and the tether disconnected) will the trailer be considered 'untethered' from the tractor. Therefore, if for some reason the presence of external power is the only indication that the trailer is tethered, the loss of that external power will trigger the untethered condition.

If the trailer status is mobile at step 140, and the Tracking Mode is on (step 142), the Tracking Mode is canceled (step 144). The microprocessor 32 then activates the cellular transceiver 38 to transmit a wireless 'arrival' message indicating that the trailer has arrived at its destination (step 118). Based on the wireless 'arrival' message, the asset tracking provider system 16 preferably sends a corresponding 'arrival' message to the asset owner system 18. The 'arrival' message also preferably indicates what event triggered the message, such as a door being opened or the tether being disconnected. Alternatively, the triggering event may be indicated in an event message transmitted separately from the 'arrival' message. The 'arrival' message also preferably indicates the most recent GPS location reading.

In the preferred embodiment of the invention, the response of the asset owner system 18 to the 'arrival' message depends upon preferences programmed into the software running on the asset owner system 18. For example, an 'arrival' message may prompt the asset owner system 18 to send a begin-tracking message to the ATD 12 to reactivate the Tracking Mode to report any movement of the trailer beyond the radius of the geoboundary. In this situation, processing continues at step 104 of FIG. 3, with the trailer status being stationary.

Referring again to FIG. 3, if the trailer moves beyond the radius of the geoboundary (step 108) while the trailer status is stationary (step 110), this preferably indicates a 'departure'. At this point, the trailer status is preferably changed from stationary to mobile (step 124), and the microprocessor 32 activates the cellular transceiver 38 to transmit a wireless 'departure' message indicating that the trailer has departed from its stationary location (step 122). Based on the wireless 'departure' message, the asset tracking provider system 16 preferably sends a corresponding 'departure' message to the asset owner system 18. The 'departure' message also preferably indicates the most recent GPS location reading prior to departure.

As with the response to the 'arrival' message, the response of the asset owner system 18 to the 'departure' message depends upon preferences programmed into the software running on the asset owner system 18. For example, a 'departure' message may prompt the asset owner system 18 to send a begin-tracking message to the ATD 12 to reactivate the Tracking Mode to monitor and report the progress of the trailer as it travels to its next destination. In this situation, processing continues at step 100 of FIG. 3, with the trailer status being mobile.

In the preferred embodiment of the invention, changes in the trailer's load status also indicate an 'arrival' or 'departure'. With reference again to FIG. 4, the microprocessor 32 receives the load status signal from the load sensor 26 and determines based thereon whether the load status has changed since the previous reading. If the load status signal indicates that a previously-loaded trailer has been unloaded (step 142), the load status is set to unloaded (step 144), and processing continues at step 130. If the trailer status is mobile, a change in load status from loaded to unloaded is an indication of an arrival, which triggers transmission of an 'arrival' message (steps 132–140).

If the load status signal indicates that a previously-unloaded trailer has been loaded (step 150), the microprocessor 32 continues to monitor the door status signal to determine when the trailer doors are closed (step 152). In the preferred embodiment of the invention, only when the load sensor signal indicates that the trailer is loaded and the door sensor indicates that the trailer doors have been closed is the load status set to loaded (step 154). This allows personnel to walk into and out of the trailer without changing the load status. The change of the load status from unloaded to loaded is another indication of a 'departure', which triggers a trailer status change from stationary to mobile (step 124 of FIG. 3) and the transmission of a 'departure' message (step 122), as described above.

Figure 5:
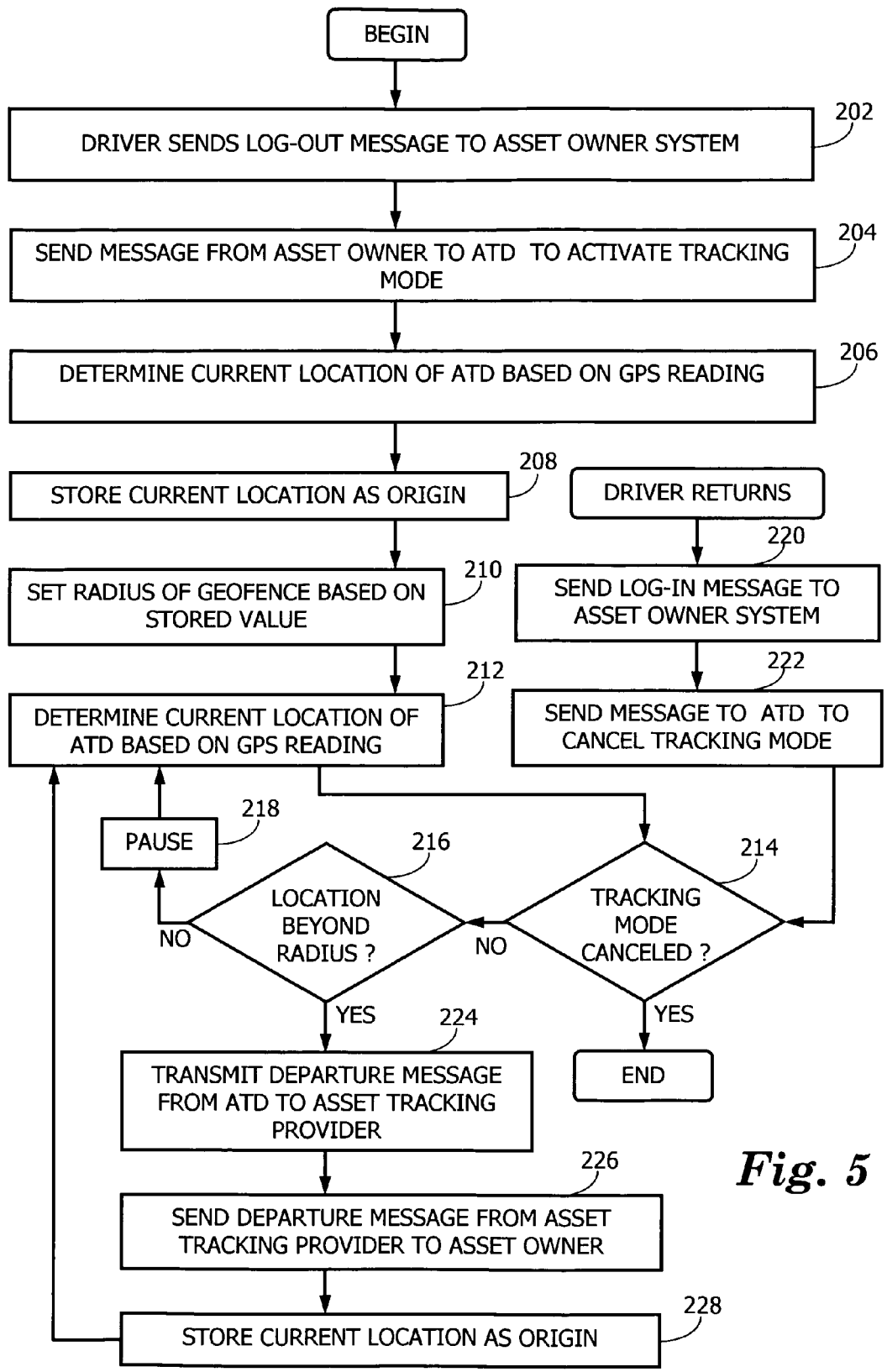

The system 10 may also be used for monitoring an asset in transit, such as a trailer attached to a tractor, when the driver must leave the tractor/trailer unattended for some short period of time, such as for a rest room break. A preferred embodiment of the operation of the system 10 in this mode is depicted in FIG. 5. When the driver must leave the trailer unattended, the driver first "logs out" of the tractor by sending a log-out message by any available means to the asset owner system 18 (step 202). For example, the transmission of the log-out message may be accomplished via an email message from a wireless mobile communications unit 13 (FIG. 1) in the tractor, such as by using an OmniTRACS™ system manufactured by Qualcomm, Inc. Upon receipt of the log-out message, the asset owner system 18 preferably sends a begin-tracking message to the ATD 12 (such as via the asset tracking provider system 16 and the wireless communication provider system 14) to activate the Tracking Mode of the ATD's firmware (step 204).

Upon activation of the Tracking Mode, the microprocessor 32 receives a location update reading from the GPS receiver 36 (step 206), and the location coordinates are stored as the 'origin' (step 208). The microprocessor 32 accesses the memory 34 and retrieves therefrom a previously-stored geoboundary radius value to define an imaginary circular boundary around the origin (step 210). In this situation, the radius of the geoboundary may be relatively small, such as one tenth of a mile or less. Periodically thereafter, the microprocessor 32 receives a location update reading from the GPS receiver 36 (step 212). While the Tracking Mode is still active (step 214), the microprocessor 32 calculates the distance between the updated location and the origin, and determines whether the distance between the updated location and the origin is greater than the radius (step 216). If the calculated distance is less than the radius, there is a pause (step 218), such as one minute, before the next GPS location update is processed (step 212). This loop (steps 212–218) continues until either the Tracking Mode is cancelled, or the calculated distance is greater than the radius.

When the driver returns to the tractor, the driver "logs in" by sending a log-in message by any available means to the asset owner system 18 (step 220). For example, the transmission of the log-in message may be accomplished via an email message from the wireless mobile communications unit 13 in the tractor, such as by using the OmniTRACS™ system manufactured by Qualcomm, Inc. Upon receipt of the log-in message, the asset owner system 18 preferably sends an end-tracking message to the ATD 12 (such as via the asset tracking provider system 16 and the wireless communication provider system 14) to deactivate the Tracking Mode (step 222). This serves to interrupt the processing loop of steps 212–218.

If the trailer moves beyond the radius of the geoboundary (step 216) before the driver sends the log-in message (i.e., before the Tracking Mode is deactivated), an unauthorized departure has occurred. This would occur if the trailer were stolen, or if the driver returned to the tractor and drove away prior to sending the log-in message. In either case, the microprocessor 32 activates the cellular transceiver 38 to transmit a wireless 'departure' message indicating that the trailer has traveled beyond the geoboundary radius (step 224). Based on the wireless 'departure' message, the asset tracking provider system 16 sends a corresponding 'departure' message to the asset owner system 18 (step 226). The most recent GPS location coordinates are stored as the new 'origin' (step 228), and the process loops back to step 212. The process loop then continues providing location updates until the Tracking Mode is deactivated by an end-tracking message from the asset owner system 18 (step 222). In this manner, the asset owner system 18 can continuously track the movements of a stolen trailer.

Referring again to FIG. 2, it will be appreciated that a manual user input 35 may be provided in an alternative embodiment. In such case, the begin-tracking or end-tracking messages which activate or deactivate the Tracking Mode may be provided by the driver directly to the microprocessor 32, preferably using codes to indicate the desired action or mode of operation. For example, the driver may directly input a code to tell the microprocessor 32 that the driver has exited the cab (a log-out or begin-tracking message) or that the driver has re-entered (a log-in or end-tracking message). When the codes are entered manually, the microprocessor 32 performs the desired function as if the function had been initiated by other techniques as described above.

The manual user input 35 may be hardwired to the microprocessor 32 and may be a conventional keyboard and display-type device. Alternatively the input 35 may be a wireless type input device that communicates with the microprocessor 32 by wireless communications. However, there are security advantages to not using a manual user input 35, or not providing easy access to the input 35, and thus the preferred embodiment provides for communication between the driver and the microprocessor 32 as first described without the use of a manual input 35.

In the preferred embodiment of the invention, other trailer monitoring functions, such as those described previously in reference to FIGS. 3 and 4 are also functional after an unauthorized departure. Thus, if the trailer were disconnected from the tractor (tether disconnect), if the trailer doors were opened, or if the trailer were unloaded, the system 10 would notify the asset owner system 18 of such occurrences, preferably according to the procedures described above.

It is contemplated, and will be apparent to those skilled in the art from the preceding description and the accompanying drawings that modifications and/or changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. A method for monitoring and reporting the status of a mobile asset, where the mobile asset may be moved by a transport vehicle from one location to another location, the transport vehicle operated by a driver, the method comprising:
    (a) transmitting a driver exit message indicating that the driver is exiting the vehicle;
    (b) receiving the driver exit message at a central monitoring station that is remote from the transport vehicle;
    (c) determining a first location of the mobile asset and a first boundary about the first location based on receipt of the driver exit message;
    (d) determining whether the mobile asset moves beyond the first boundary before a driver reentry message is transmitted to the central monitoring station; and
    (e) transmitting a status message to the central monitoring station when the mobile asset has moved beyond the first boundary before the driver reentry message is transmitted.

2. A system for monitoring the status of a mobile asset, where the mobile asset may be moved by a transport vehicle from one location to another location, the transport vehicle operated by a driver, the system comprising:
    a central monitoring station located remotely from the transport vehicle, the central monitoring station for receiving status messages related to the status of the mobile asset, and for transmitting begin-tracking and end-tracking messages; and
    an asset tracking device associated with the mobile asset, comprising:
        a location determining device for determining a geographic location of the mobile asset, and for providing a location signal indicative of the geographic location of the mobile asset;
        a transmitter for transmitting status messages related to the status of the mobile asset;
        a receiver operable to receive the begin-tracking and end-tracking messages; and
        a processor in communication with the transmitter and receiver, where upon receipt of the begin-tracking message, the processor
            (a) determines a first location of the mobile asset and a first boundary about the first location,
            (b) determines based on the location signal whether the mobile asset moves beyond the first boundary, and
            (c) activates the transmitter to transmit a status message when the mobile asset has moved beyond the first boundary, and
            upon receipt of the end-tracking message, the processor does not activate the transmitter to transmit a status message when the mobile asset has moved beyond the first boundary.

3. The system of claim 2, further comprising:
    a wireless mobile communications unit operable by the driver to transmit log-out and log-in messages; and
    the central monitoring station operable in response to a log-out message to send the begin-tracking message to the asset tracking device, and operable in response to a log-in message to send the end-tracking message to the asset tracking device.

4. The system of claim 3 wherein the wireless mobile communications unit comprises a transceiver installed in the transport vehicle.

5. The system of claim 3 wherein the log-out and log-in messages comprise email messages.

6. The system of claim 2, further comprising:
    the transmitter further for transmitting log-out and log-in messages based on operations initiated by the driver; and
    the central monitoring station for sending the begin-tracking message to the asset tracking device in response to a log-out message transmitted from the transmitter of the asset tracking device, and for sending the end-tracking message to the asset tracking device in response to a log-in message transmitted from the transmitter of the asset tracking device.

7. The method of claim 1 wherein step (a) further comprises transmitting the driver exit message from a wireless communications device installed in the transport vehicle.

8. The method of claim 1 wherein step (a) further comprises sending an email message including the driver exit message.

9. The method of claim 1 further comprising (f) transmitting the driver reentry message to the central monitoring station indicating that the driver has returned to the transport vehicle.

10. The method of claim 9 wherein step (f) further comprises sending an email message including the driver reentry message.

11. An apparatus for monitoring and reporting the status of a mobile asset, where the mobile asset may be moved by a transport vehicle from one location to another location, the transport vehicle operated by a driver, the apparatus comprising:
    means for transmitting a driver exit message from the transport vehicle indicating that the driver is exiting the transport vehicle;
    means for receiving the driver exit message at a central monitoring station that is remote from the transport vehicle;
    means for determining a first location of the mobile asset;
    means for determining a first boundary about the first location based on receipt of the driver exit message and for determining whether the mobile asset moves beyond the first boundary before a driver reentry message is received; and
    means for transmitting a status message to a central monitoring station when the mobile asset has moved beyond the first boundary before the driver reentry message is received.

12. The apparatus of claim 11 wherein the means for transmitting a driver exit message and the means for transmitting a status message comprise a communication unit installed in the transport vehicle.

13. The apparatus of claim 11 wherein the means for determining a first location of the mobile asset comprise a GPS receiver.

14. A method for monitoring a mobile asset at a central monitoring station, the mobile asset having an asset tracking device associated therewith, where the mobile asset may be moved by a transport vehicle from one location to another location, the transport vehicle operated by a driver, the method comprising:
   (a) transmitting a driver exit message to the central monitoring station indicating that the driver is exiting the transport vehicle;
   (b) receiving the driver exit message at the central monitoring station;
   (c) upon receipt of the driver exit message, transmitting a begin tracking message from the central monitoring station to the asset tracking device;
   (d) upon receipt of the begin tracking message, determining a first location of the mobile asset and a first boundary about the first location;
   (d) monitoring whether the mobile asset moves beyond the first boundary; and
   (e) if the mobile asset moves beyond the first boundary before an end tracking message is transmitted to the asset tracking device, transmitting a departure message to the central monitoring station.

15. The method of claim 14 further comprising:
   (f) transmitting a driver reentry message to the central monitoring station indicating that the driver has reentered the transport vehicle;
   (g) receiving the driver reentry message at the central monitoring station; and
   (h) upon receipt of the driver reentry message, transmitting the end tracking message from the central monitoring station to the asset tracking device.

* * * * *